Jan. 19, 1926.
F. STRAUSS
CHILD'S VEHICLE
Filed Feb. 12, 1925
1,570,410
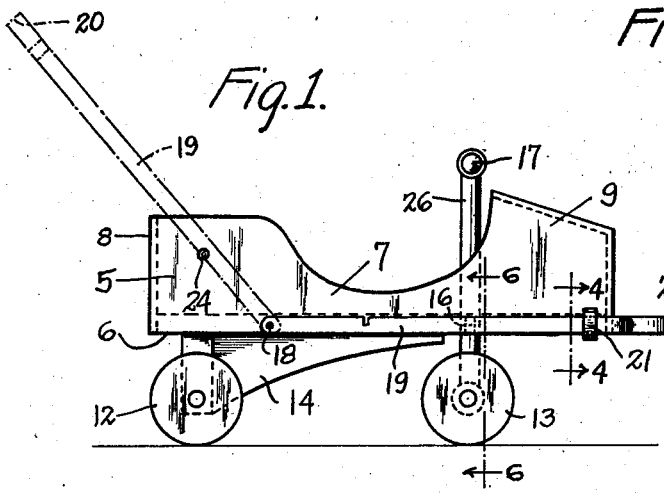
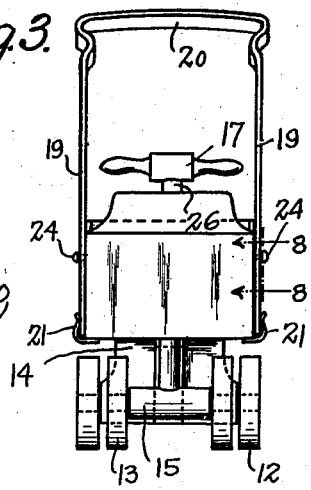
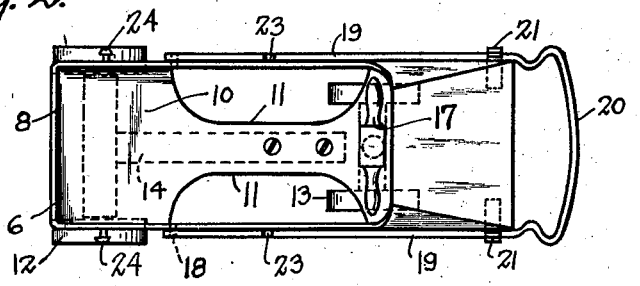
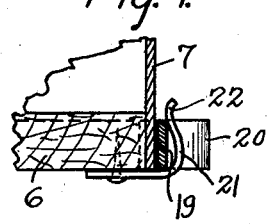
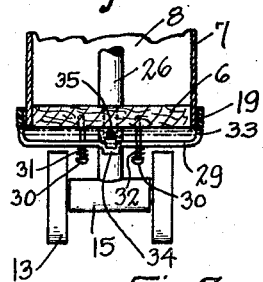
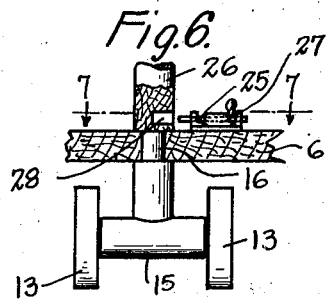
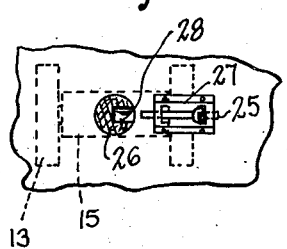
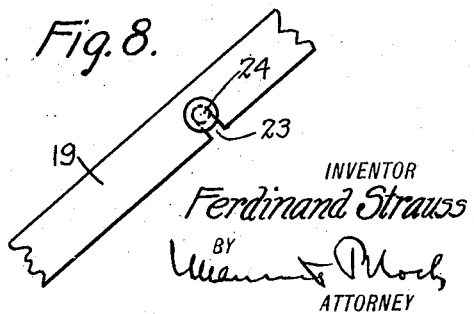
INVENTOR
Ferdinand Strauss
BY
ATTORNEY Patented Jan. 19, 1926.

1,570,410

UNITED STATES PATENT OFFICE.

FERDINAND STRAUSS, OF NEW YORK, N. Y.

CHILD'S VEHICLE.

Application filed February 12, 1925. Serial No. 8,610.

*To all whom it may concern:*

Be it known that I, FERDINAND STRAUSS, a citizen of the United States of America, residing at New York city, county of New York, and State of New York, have invented certain new and useful Improvements in Children's Vehicles, of which the following is a specification.

This invention relates to children's vehicles and in particular to a type which the child may propel himself or be pushed.

A particular object of the invention is to provide a vehicle for small children which can be propelled and steered by the child and which when the child is tired playing can be propelled by an older person instead of necessitating carrying both the child and the vehicle which is very often the case.

A further object of the invention is to provide means whereby the vehicle, when being propelled by the child can be rendered steerable and when being propelled by an adult can have its steering gear locked so that the wheels will be held straight.

A further object is to provide a handle for a vehicle of this character which when not in use as a handle will serve as a bumper for the vehicle in addition to rendering the same more simulative of an automobile which as shown is the preferred form in which I make up the vehicle, although it is to be understood that the vehicle may be made in the form of a wagon or the like.

Referring to the drawing wherein I have shown a preferred embodiment of my invention:—

Figure 1 is a view in side elevation of the vehicle having a handle attached thereto, the handle being shown in outline in position to be used for pushing the vehicle.

Figure 2 is a top plan view of the vehicle as seen in Fig. 1.

Figure 3 is a view in front elevation of the vehicle as seen in Figure 1, the handle in this instance being shown raised.

Figure 4 is an enlarged section taken on the line 4—4 of Fig. 1 showing one of the handle locking members.

Figure 5 is a partial front view of a vehicle having applied thereto an automatic steering gear locking device, Figure 6 is an enlarged section taken on the line 6—6 of Figure 1, Figure 7 is an enlarged section taken on the line 7—7 of Fig. 6, and Figure 8 is an enlarged section taken on the line 8—8 of Figure 3.

Referring to the drawing in detail 5 indicates the body of a vehicle and 6 the bottom thereof, the body being shaped in this instance to simulate an automobile having the usual sides 7, back 8 and hood-like front 9, the latter being hollow and providing a space in which the child's feet may rest on the bottom of the vehicle.

The bottom 6 is provided with a seat portion 10 and the mid portion thereof is provided with side cut-outs 11 through which the child's legs may extend to allow of propulsion of the vehicle.

The vehicle body is held in spaced relation with the ground through the medium of the rear wheels 12 and front wheels 13, the rear wheels being journaled to a frame 14 secured to the under side of the bottom 6 while the front wheels are carried on the ends of a cross piece 15 to which is secured the lower end of a steering post 26, the same being reduced as at 16 where it passes through the bottom 6 to form a journal for the post, the upper end of which is provided with the handle 17 whereby the front wheels may be steered.

In vehicles adapted for small children it is often necessary to carry the vehicle and a tired child as no means have been provided for pushing the vehicle by an adult and in order to overcome this objection I pivot as at 18 to the sides of the body a substantially V-shaped handle member the sides 19 of which extend along the sides of the body and terminate in the closed forward end 20, which projects beyond the front of the vehicle and is bulged outwardly to form a bumper. This front end 20 may be a separate piece or as shown, be made integral with the side pieces 19 and be nickel plated to give an attractive appearance. Also it may be of tough resilient metal to resist any object with which the vehicle collides to thereby prevent injury to the vehicle and occupant.

In order to hold the handle down I provide locking members 21 which are suitably secured to the bottom of the vehicle and are made of spring steel or metal having the upper ends 22 bent outwardly so that the handle may be snapped thereinto and be securely but releasably held. The sides of the handle are pivoted at their ends to the sides of the vehicle at a point adjacent the rear of the latter but forward of the back wheels so that when going up a curb stone the front of the vehicle can be raised by a downward pressure on the handle.

The sides of the handle are provided with slots 23 which engage the pins 24 fixed in the sides of the body portion near the rear thereof and in position to allow the handle to be disposed at a suitable angle when in raised position. The slots may be cut so that they will frictionally engage the pins 24, to prevent the accidental throwing of the handle forward when in raised position.

In order to lock the steering post when the vehicle is to be pushed I provide a bolt member 25 on the bottom 6 adjacent the post 26 held in a bolt retainer 27 which is suitably secured to the bottom 6, and in the post 26 I provide a bolt receiving cut out or bore 28. When the handle is to be used the bolt is slid into the bore 28 and prevents the post from turning thereby maintaining the front wheels straight.

In Figure 5 I have shown an automatic locking member which consists of a locking bar 29 through which pass the pins 30 secured in the bottom 6 and around which beneath the bar are disposed the coiled springs 31 and 32 to force the bar 29 towards the bottom 6. The ends of the bar 29 are upturned as at 33 to underlie the sides 19 of the handle and at the center of the bar I provide a notch 34 into which a pin 35 on the steering post 26 can be snapped, if it is turned so as not to match the notch. Therefore when the handle is raised the springs force the locking bar 29 into position to engage the pin 35 in the notch 34 and hold the wheels straight, it being understood that they will be straightened before the handle is lifted.

When the handle is down the bar is of course forced down and held down so that the child may steer the vehicle at will.

From the foregoing it will be seen that I have provided a convenient means for adult propulsion of a child's vehicle and one which will serve a useful purpose when not in use as a handle; to protect the vehicle and the occupant. Also I have provided a locking means to be used in conjunction with the handle whereby the vehicle will travel straight. Also that instead of carrying the child its legs can be placed up under the hood, the handle drawn up and the vehicle propelled by an adult.

Having described my invention what I claim is:—

1. A child's vehicle comprising a body portion, and a handle pivoted on said body portion for propelling the vehicle, said handle being also arranged to serve as a bumper for the vehicle.

2. In a child's vehicle, a member pivoted thereto, said member when in one position being adapted to serve as a handle and when in another position being adapted to serve as bumper for the vehicle.

3. A child's vehicle having pivoted thereto a handle, said handle when folded down over the front of the vehicle being adapted to serve as a bumper.

4. A child's vehicle comprising a wheeled body portion, means for steering the vehicle, a handle associated with said vehicle adapted to serve in one position as a bumper, and means for locking said steering means when the handle is used whereby the vehicle will travel in substantially a straight line.

5. A child's vehicle comprising a body portion, a member pivoted to said body portion and arranged to serve as a handle, the end of said member extending beyond the front of the vehicle to form a bumper therefor when said member is swung forwardly about its pivot point.

6. In a child's vehicle, a member pivoted thereto and adapted to be raised to serve as a handle, said member when lowered being adapted to serve as a bumper for the vehicle and means for releasably maintaining the member in lowered position.

7. A child's vehicle comprising a body portion, a member pivoted to said body portion and disposed in a plane with the bottom of said body portion, and said member extending beyond the front of said body portion to form a bumper for the vehicle.

8. A child's vehicle having pivoted thereto, a handle, said handle being provided with a bulging portion, which serves as a bumper for the vehicle when said handle is folded down.

9. A child's vehicle comprising a wheeled body portion, means for steering the vehicle, a pivoted handle for said vehicle arranged to swing down over the front of the vehicle to serve as a bumper, and means for locking said steering means.

10. A child's vehicle having rods normally supported at each side of the vehicle in a substantially horizontal position to serve as a bumper and arranged to be positioned rearwardly of the vehicle in inclined position to provide a handle.

11. A child's vehicle capable of being propelled by the occupant and having on it a handle by which it can be propelled by a person other than the occupant, the said handle being so mounted thereon that it can be swung or moved from a position into which it is available as a handle to an unobtrusive position or to a position in which it will appear to form part of the structure of the vehicle with or without a spring-buffer for the front of the vehicle.

In testimony whereof I hereunto affix my signature.

FERDINAND STRAUSS.